United States Patent [19]
Bharadhwaj

[11] Patent Number: 6,061,713
[45] Date of Patent: May 9, 2000

[54] COMMUNICATIONS SYSTEM FOR CLIENT-SERVER DATA PROCESSING SYSTEMS

[75] Inventor: Rajeev Bharadhwaj, Aurora, Colo.

[73] Assignee: Fujitsu Limited, Japan

[21] Appl. No.: 08/815,742

[22] Filed: Mar. 12, 1997

[51] Int. Cl.$^7$ .................................................. G06F 13/14
[52] U.S. Cl. .......................................... 709/203; 709/300
[58] Field of Search ..................................... 709/300–305, 709/203–232, 101

[56] References Cited

PUBLICATIONS

Orfali et al. "The Essential Client/Server Survival Guide" Wiley, pp. 135–138, 275–318, 1996.
Dolgicer, Max, "A Formal Look at Tuxedo" Data Communications, vol. 22, No. 12, pp(4), 1993.
Cobb, Edward E., "TP monitors and ORBs" Object Magazine, pp. 57–61, Feb. 1995.
(No author given) "DEC OSF/1 Network and Communications Overview" DEC, All pages sections 1–9, Feb. 1994.

*Primary Examiner*—Alvin E. Oberley
*Assistant Examiner*—St. John Courtenay, III
*Attorney, Agent, or Firm*—Carr & Ferrell LLP

[57] ABSTRACT

A system for managing communication between a client program and a server program. A port service module manages a plurality of domain ports. Each domain port has predefined characteristics which are used by the port service module to direct which server computer programs or which instances of server computer programs with which a client computer program will interact. The domain port characteristics also direct the port service module whether to order messages, count messages, and/or monitor for different types of error conditions in communications between the client program and the server program.

23 Claims, 6 Drawing Sheets

① Request port registration handle given service name
② Return port registration handle
③ Request service via port registration handle
④ First instance of Second Server Program initiated
⑤ Second Port Service Module called to replicate service
⑥ Second instance of Second Server Program initiated
⑦ Return port service handle of Second Server Program
⑧ Client communicates with server program through Port Service Module

Port Service Module

212

| DOMAIN PORTS | Domain Port Name 212a | Characteristics | 214a |
| :--- | :--- | :--- | :--- |
| | | Server Node List | 216a |
| | | Client Connection List | 218a |
| | Domain Port Name 212b | Characteristics | 214b |
| | | Server Node List | 216b |
| | | Client Connection List | 218b |
| | Domain Port Name 212c | Characteristics | 214c |
| | | Server Node List | 216c |
| | | Client Connection List | 218c |
| | ⋮ | | |
| | Domain Port Name 212n | Characteristics | 214n |
| | | Server Node List | 216n |
| | | Client Connection List | 218n |

Fig. 2

| | | | |
|---|---|---|---|
| CHARACTERISTICS 214 | Selection Criteria 306 | find-next | 318a |
| | | find-nearest | |
| | | find-in-specific-node | |
| | Port Type Location 308 | domain array | |
| | | domain port | |
| | | domain group | |
| | | domain object | |
| | Message Ordering 310 | unordered | |
| | | first-in-first-out | |
| | | partial | |
| | | priority | |
| | | total | |
| | Execution Semantics 312 | at-most-once | |
| | | exactly once | |
| | | at-least once | |
| | Error Semantics 314 | bounded time | |
| | | orphan detection | |
| | Miscellaneous 316 | voting | |
| | | rerouting | |
| | | filtering | |
| | | mirroring | |
| | | load balancing | |
| | | striping | |
| | | compression | |
| | | encryption | |
| | | message logging | |

COMMUNICATIONS SYSTEM FOR CLIENT-SERVER DATA PROCESSING SYSTEMS

CROSS-REFERENCE TO CO-PENDING APPLICATIONS

This application is related to following co-pending patent applications: "A SYSTEM AND METHOD FOR EXECUTION MANAGEMENT OF COMPUTER PROGRAMS" Ser. No. 08/778,213, which was filed on Dec. 30, 1996 by Rajeev Bharadhwaj; and "A NAMING SYSTEM FOR HIERARCHICALLY NAMED COMPUTER ACCESSIBLE OBJECTS" Ser. No. 08/815,748, now U.S. Pat. No. 5,995,999 by Rajeev Bharadhwaj and filed on Mar. 12, 1997, both of which are assigned to the assignee of the present invention, and both of which are hereby incorporated by reference.

BACKGROUND OF THE INVENTION

1. Field of the Invention

The present invention generally relates to client-server type data processing systems, and more particularly to a communication system for use in controlling message transfer between client programs and server programs.

2. Description of Background Art

Usage of client-server type data processing systems continues to increase. Client-server systems offer flexibility in the distribution of processing tasks between various systems on a network. Despite their apparent popularity, creating a client-server system meets obstacles in which the client and the server programs must be programmed to a common communication protocol. If there is only one protocol utilized, programming the client and the server is most likely not a significant obstacle. However, where there are multiple server programs, each requiring a different protocol, or a similar protocol which is similar in some respects but different in other respects, the work required to program the various server program protocols increases.

From the perspective of programming a client program, as long as object characteristics for the server programs are fixed, the client will not have to change its operational parameters. However, when a network address for a server application is changed, the client must be informed of the new address. If there is only one client program, then making the change is fairly inconsequential. However, where there are hundreds or even thousands of client programs, making the change may involve considerable effort.

Therefore, what is needed is a communication system that simplifies the process of coordinating communications between client and server programs, and which supports globally named objects.

SUMMARY OF THE INVENTION

The present invention is a communication system that reduces the difficulty involved in establishing and maintaining multiple types of client-server systems having various types of communication protocols. The invention provides the capability to define multiple domain ports, each used to support a different type of communication protocol between a client program and a server program. In addition, a domain port may be utilized to provide assorted functions to a server program, such as message compression, message encryption, message logging, mirroring, striping, etc. The invention also provides named access to distributed services, thereby eliminating the need for client programs and server programs to coordinate directly one with another as to the naming/addressing of services.

Domain ports are established by a port service module, each domain port having a plurality of characteristics. The characteristics of a domain port are used by the port service module in controlling communications between a client program and a server program which communicate via the domain port. The usage of the domain port characteristics by the port service module frees the client program and server program from having to manage various communication protocol semantics.

A domain port may be defined to have characteristics for ordering and counting messages exchanged between a client program and a server program. The domain port may also be defined to have characteristics for monitoring for different types of error conditions. If a domain port has a characteristic defined which dictates that messages are to be ordered, the port service module orders messages sent between a client program and a server program according to an order which is predetermined according to the requirements of the particular client and server programs. Similarly, if a domain port has a characteristic defined which dictates that messages are to be counted, the port service module counts messages exchanged between client and server programs according to the particular requirements.

A domain port may be defined to have characteristics such as message compression, message encryption, message logging, mirroring, striping, etc. In response to such defined characteristics, the port service module performs the function associated with the specified characteristic. Because the port service module performs the desired function, the server program does not have to.

The invention also provides named access to distributed services, thereby eliminating the need for client programs and server programs to coordinate directly one with another as to naming of services. The port service module is responsive to a port registration handle whose association with a named service is maintained by a global namer module. Thus, the client program need only remember a service name, while a global namer module provides the association with domain port, and the port service module associates the domain port with particular server programs and/or instances thereof.

DETAILED DESCRIPTION

Figure 1:
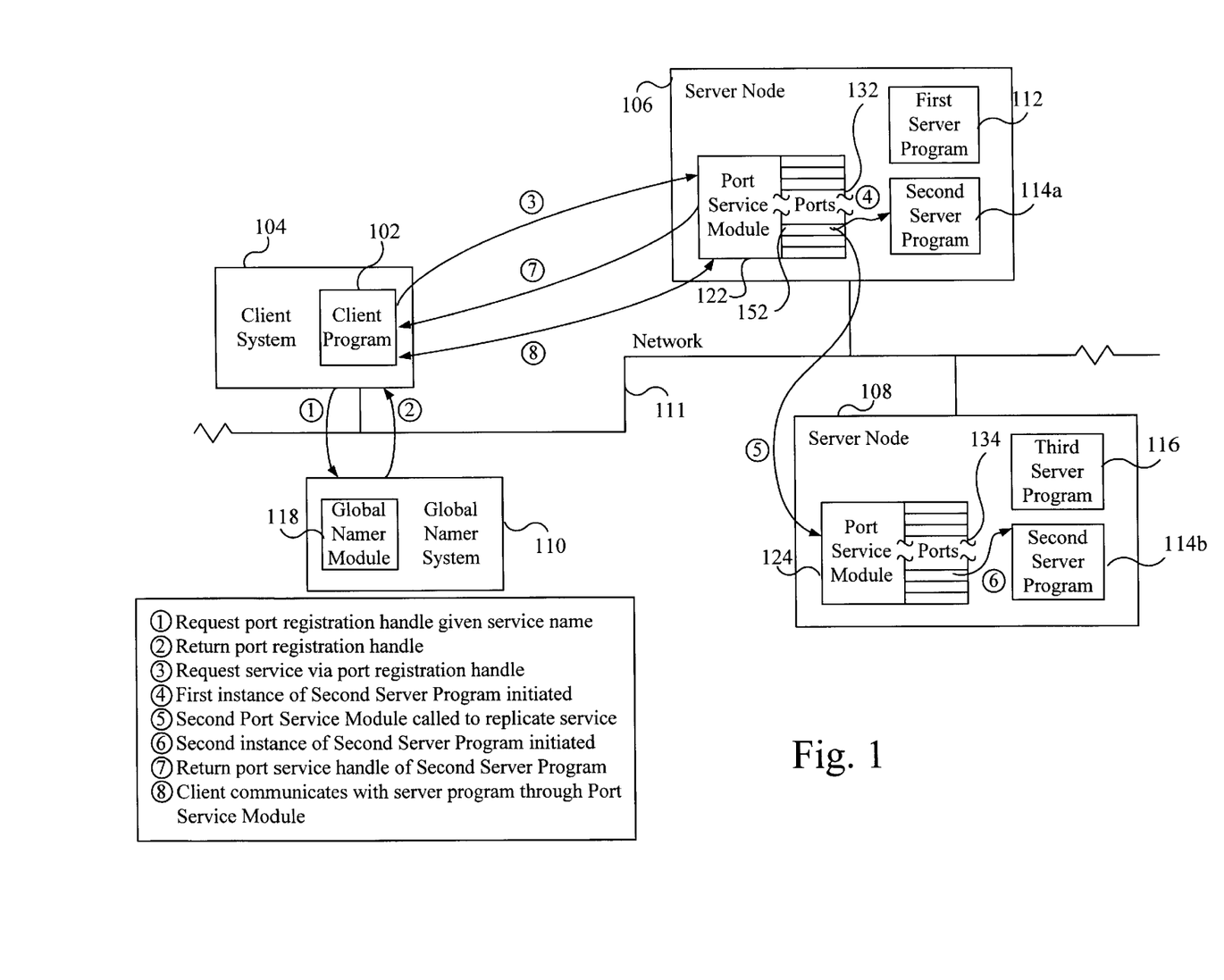
FIG. 1 is a block diagram of an exemplary client-server data processing system in accordance with the present invention.

FIG. 1 is a block diagram of an exemplary client-server data processing system in accordance with the present invention. The exemplary system includes a client system 104, server nodes 106 and 108, and a global namer system 110. Each of client system 104, server nodes 106 and 108, and global namer system 110 is a conventional data processing system, where the particular hardware is selected according to the processing needs of the programs. The client system 104, server nodes 106 and 108, and global namer system 110 are coupled to network 111.

The client system 104 hosts client program 102; server node 106 hosts a first server program 112 and a first instance of a second server program 114a; server node 108 hosts a second instance of the second server program, designated as 114b, and a third server program 116; and global namer system 110 hosts the global namer module 118. Each of the server nodes 106 and 108 also has a respective port service module 122 and 124.

The exemplary client program 102 is designed to utilize the services of the first instance of the second server program 114a. The first server program 112 and the third server program 116 are shown for illustrative purposes only.

Each of the port service modules 122 and 124 is responsive to requests made by client program 102 for access to server program 114a–b and requests made by other client programs (not shown) to server programs 112 and 116. The port service modules 122 and 124 maintain a plurality of domain ports, one for each server program. Port service module 122 is shown with domain ports 132, and port service module 124 is shown with domain ports 134. The domain ports 132 or 134 are used by the respective port service modules to manage communication between a client program 102 and a server program 112. The port service modules 122 and 124 also manage communication between other client programs (not shown) and server programs 112 and 116.

The global namer module 118 is hosted by the global namer system 110. Given a name of a service, the global namer module 118 supplies an identifier for the port service module 122 or 124 and domain port to which a request for the service should be directed. The global namer module 118 maintains an association between names of server programs 112, 114a–b, and 116 and the domain ports 132 and 134 through which they are accessed. The global namer thereby frees a client program 102 from having to remember and maintain the associations between the domain ports 132 and 134 and the server programs 112, 114a–b, and 116. A request from a client program 102 to the global namer module 118 includes a name of a service which is also generally known by other client programs utilizing the service. In response, the global namer module returns a port registration handle. A port registration handle identifies a particular port service module 122 or 124 along with a particular one of the ports 132 or 134 managed by the port service module. The global namer module 118 may be implemented by one skilled in the art, or the global naming system of the cross-referenced patent application may be used as the global namer module.

The directional lines of FIG. 1 illustrate an example flow of requests where client program 102 requests the service of second server program 114a–b. Note that client program 102 does not explicitly request both of second server programs 114a and 114b, but instead refers by name to the service provided by server programs 114a and 114b.

Line 1 shows the flow of a request from the client program 102 to the global namer module 118. The request includes a name of a service, the port service handle, provided by the server program 114a–b. The global namer module 118 returns a port registration handle to the client program 102 as illustrated by line 2. The port registration handle includes the address of the port service module 122 and identifies the particular port 152 used to access the requested server program 114a–b. Line 3 shows the client program making the request for the named service to the port service module 122 via the port registration handle. The port service module then selects the domain port 152 identified by the request, and as shown by line 4, initiates the first instance of the second server program 114a.

Based on the definition of domain port 152 and as shown by line 5, the port service module 124 receives a replication request from domain port 152. The port service module 124 then initiates the second server program 114b on server node 108 as shown by line 6. The initiation of the second server program 114b on server node 108 is invisible to the client program 102. The port service module, based on the definition of port 152 initiates the second server program 114b. An example where a second instance of a server program 114b would be initiated is where data replication services are required. That is, second server program 114b on server node 108 performs the same processing of the same request as does second server program 114a on server node 106. The second server program 114a–b is freed from having to manage the replication of services (i.e., at the first instance 114a and at the second instance 114b) because the port service module 152 in combination with the port definition manage the desired replication. Service replication is but one function that the port service module could manage on behalf of a service. Other functions are described elsewhere in this specification.

Line 7 illustrates an identifier of the second server program being returned from the port service module 122 to the client program 102. Thereafter, the client program 102 communications with the server program 114a via the port service module 122 by reference to the identifier and as shown by line 8. The identifier of the server program is used where a port service module 122 manages multiple instances of a server program through a single domain port.

Figure 2:
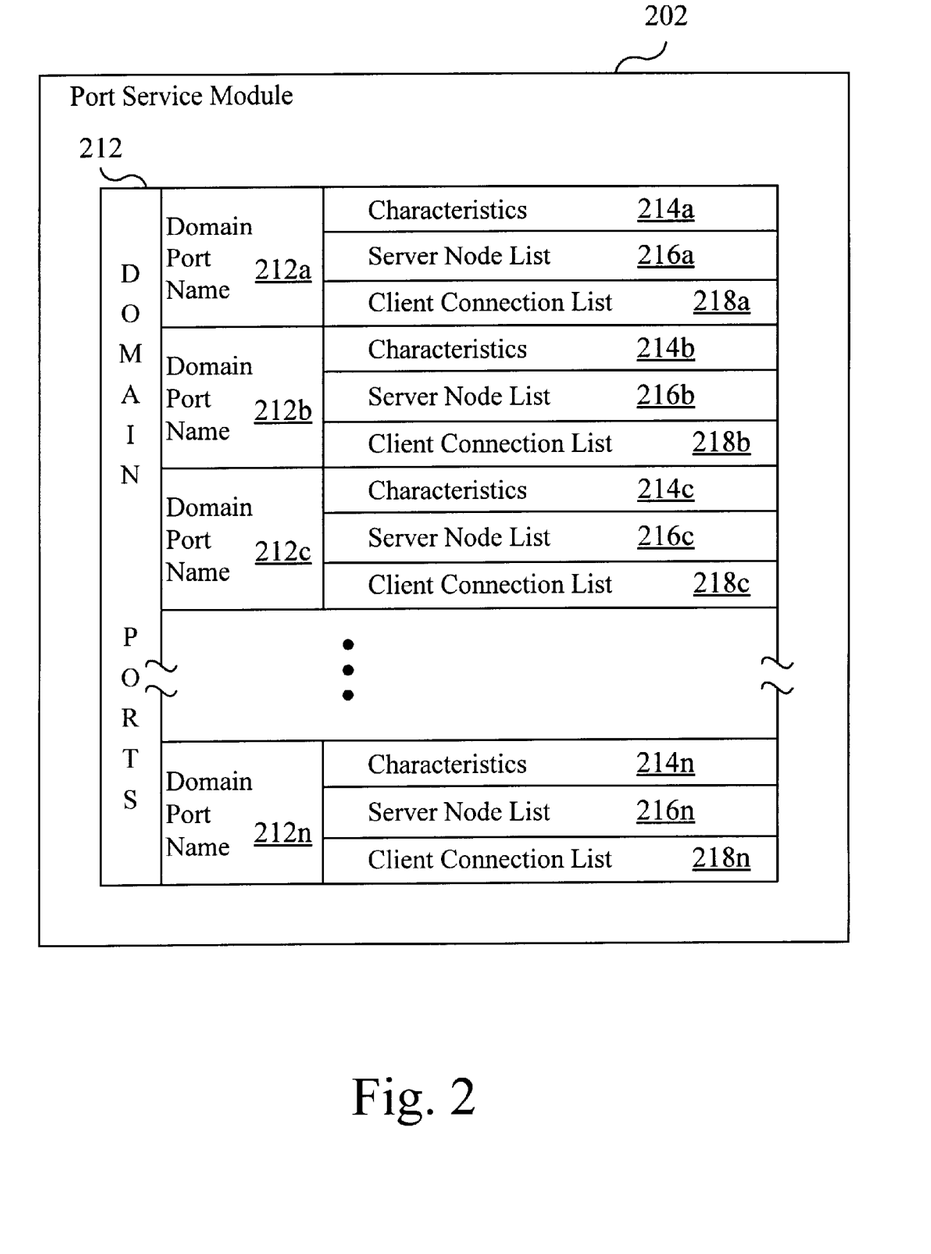
FIG. 2 is a block diagram that illustrates a port service module.

FIG. 2 is a block diagram that illustrates a port service module 202. Port service modules 122 and 124 are instances of port service module 202. The port service module 202 is a software component which interacts with client programs and server programs in a manner that depends on the definitions of the domain ports 212. The definitions for domain ports 212 are stored in memory of the host server node 106 or 108. Each of domain ports 212 is defined by a respective domain port name 212a, 212b, 212c, . . . 212n, a set of respective characteristics 214a, 214b, 214c, . . . 214n, a respective server node list 216a, 216b, 216c, . . . 216n, and a respective client connection list 218a, 218b, 218c, . . . 218n.

The characteristics 214a–n for a domain port 212a–n define various operational behaviors for a domain port. For example, the characteristics define selection criteria for selecting which instance of a server program 112, 114a–b, and 116 to execute, message ordering between a client program 102 and a server program, and various other message processing details.

A domain port server node list 216a–n identifies the various server nodes 106 and 108 that host the server program associated with the respective domain ports 212a–n. With domain port 152, for example, server node 106 and server node 108 would be identified in the domain port server node list.

The client connection lists 218a–n respectively identify the various client systems 104 connected to the domain ports. For example in FIG. 1, client system 104 is connected to domain port 152 and would be identified in the respective one of client connection lists 218a–n for domain port 152 and in the client connection list for the corresponding domain port of port service module 124. The client connection lists 218a–n may be used to inform server programs 112, 114a–b, or 116 when a client system is not communicating or is removed from the network 111.

Figure 3:
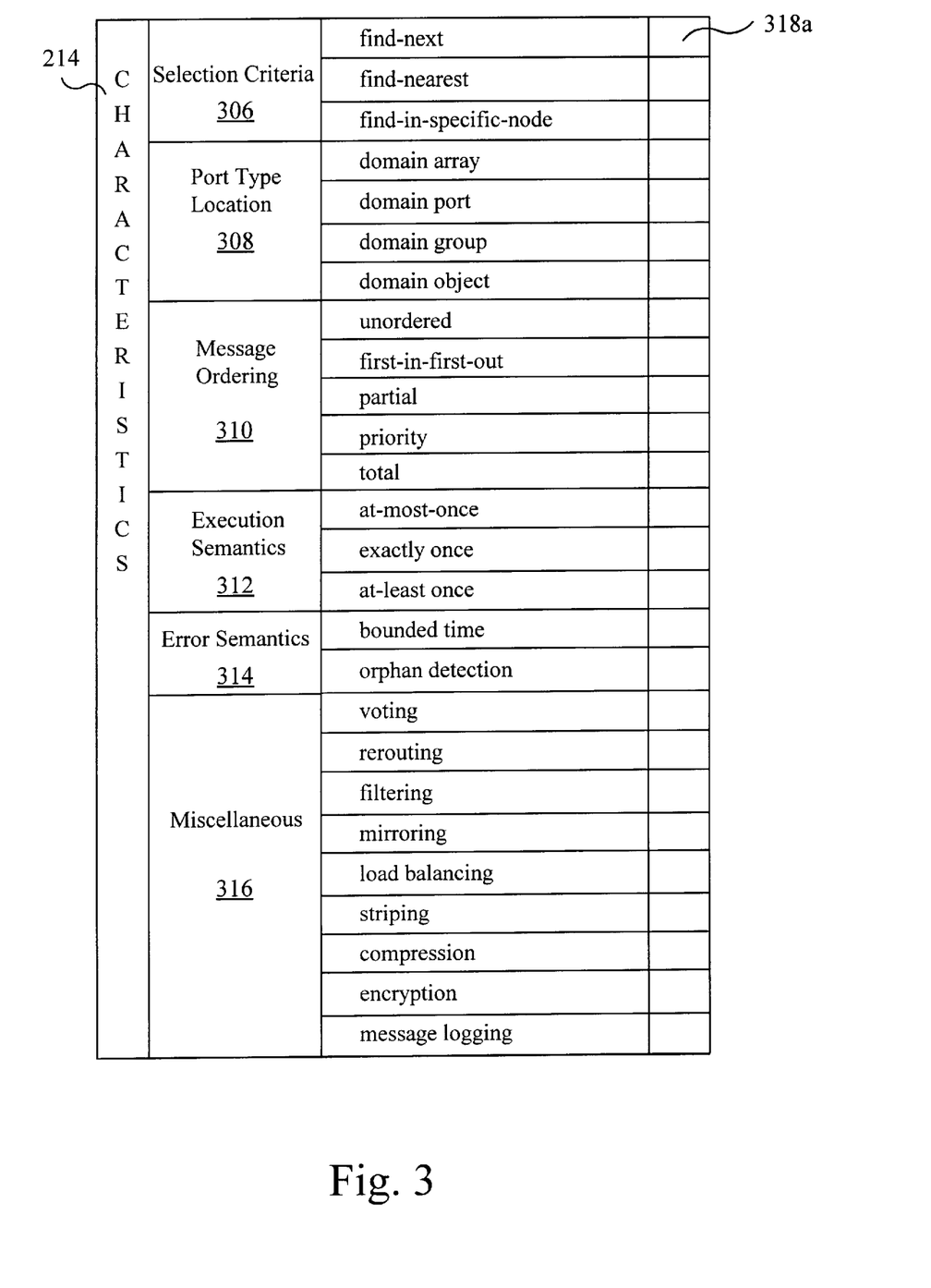
FIG. 3 is a block diagram of a characteristics table for a domain port.

FIG. 3 is a block diagram of a characteristics table 214 for a domain port 212a–n. The characteristics table 214 consists of six sets of characteristics: selection criteria 306, port type 308, message ordering 310, execution semantics 312, error semantics 314, and a set of miscellaneous characteristics 316. Memory cells are allocated for the characteristics to indicate which characteristics apply to respective one of domain ports 212. For example, cell 318a is associated with the find next characteristic. Each of the sets is described in the following paragraphs.

The selection criteria 306 characteristics are directed to selecting an instance of a server program, such as 114a or 114b, to process a request. The find-next characteristic indicates that the next available instance of a server program 112, 114a–b, 116 is to be selected to process an incoming request. The find-nearest characteristic indicates that a server program hosted by a node which is nearest to the port service module 152 in the network 111 topology is to be selected to process the request. The find-in-specific-node characteristic specifies the server node 106 or 108 that hosts the server program 112, 114a–b, 116 to be initiated. Those skilled in the art will recognize that other selection criteria could be implemented.

The port type 308 characteristics are directed to specification of the type of object to which the associated domain port, e.g., 152, provides access. For the purposes of the present invention, the port type may be any type of server program 112, 114a–b, or 116. However, for illustrative purposes, port types related to domain arrays are shown, which are described in the cross-referenced patent program.

The exemplary port types are domain array, domain port, domain group, and domain object. The domain array port type indicates that the server program is a domain array as described in the cross referenced patent program. If the associated domain port has a port type 308 of domain port, then the domain port references another domain port. While not shown, those skilled in the art will recognize that a name for the referenced domain port would need to be stored in order to reference another domain port. A domain group characteristic references a group of domain objects that cooperate to perform an program. A domain object characteristic is used to generically reference other types of objects to which access may be obtained via domain ports 212.

A domain port 212 may also possess message ordering 310 characteristics. Message ordering characteristics are used by a port service module 122 or 124 to control the exchange of messages between a client program 102 and a server program 112, 114a–b, and 116. Exemplary message ordering characteristics include unordered, first-in-first-out, partial, priority, and total. The unordered characteristic indicates that messages may arrive and be sent in any order. Thus, the port service module 122 or 124 does not need to coordinate the order of messages exchanged. The first-in-first-out characteristic indicates that the port service module 122 or 124 forwards messages from a client program 102 to a server program 112, 114a–b, 116 in the order they are received by the port service module. Message ordering is similar for messages received from a server program 112, 114a–b, 116. The specific ordering of messages for the partial characteristic is that ordering occurs only for the server program associated with the domain port. An example usage of the priority ordered characteristic is to send express messages, such as to abort a previous request. The total ordering indicates that messages are ordered for the entire domain port and any associated ports. For example, total ordering relative to FIG. 1 could order all messages between port service modules 122 and 124 for all messages to the second server program 114a.

The execution semantics 312 characteristics are also used by a port service module 122 or 124 to enforce a communication protocol to a server program 112, 114a–b, or 116. The at-most-once characteristic indicates that a message is sent to one and only one server program 112, 114a–b, or 116, and at most once to the server program. The exactly once characteristic indicates that a message is sent once and only once to a server program 112, 114a–b, or 116, and the at-least-once characteristic indicates that a message must be sent at least once to a server program.

A domain port 212 may also be used to detect errors and take predetermined actions. The error semantics 314 characteristics include bounded time and orphan detection. With the bounded time characteristic, the port service module 122 or 124 times the processing of a request by a server program 112, 114a–b, or 116 and, depending upon program requirements, may notify the client program 102 of the processing time of a request exceeds a predetermined threshold. The orphan detection characteristic indicates that the port service module 122 or 124 will detect a connection to a lost client and perform any necessary clean-up in the domain port and the domain object it supports.

The miscellaneous 316 characteristics are used to further define the operational characteristics of a domain port 212. The exemplary miscellaneous characteristics of voting, rerouting, filtering, mirroring, load balancing, striping, compression, encryption, and message logging are well known to those skilled in the art who will also recognize that other characteristics could be implemented with a domain port 212.

Figure 4:
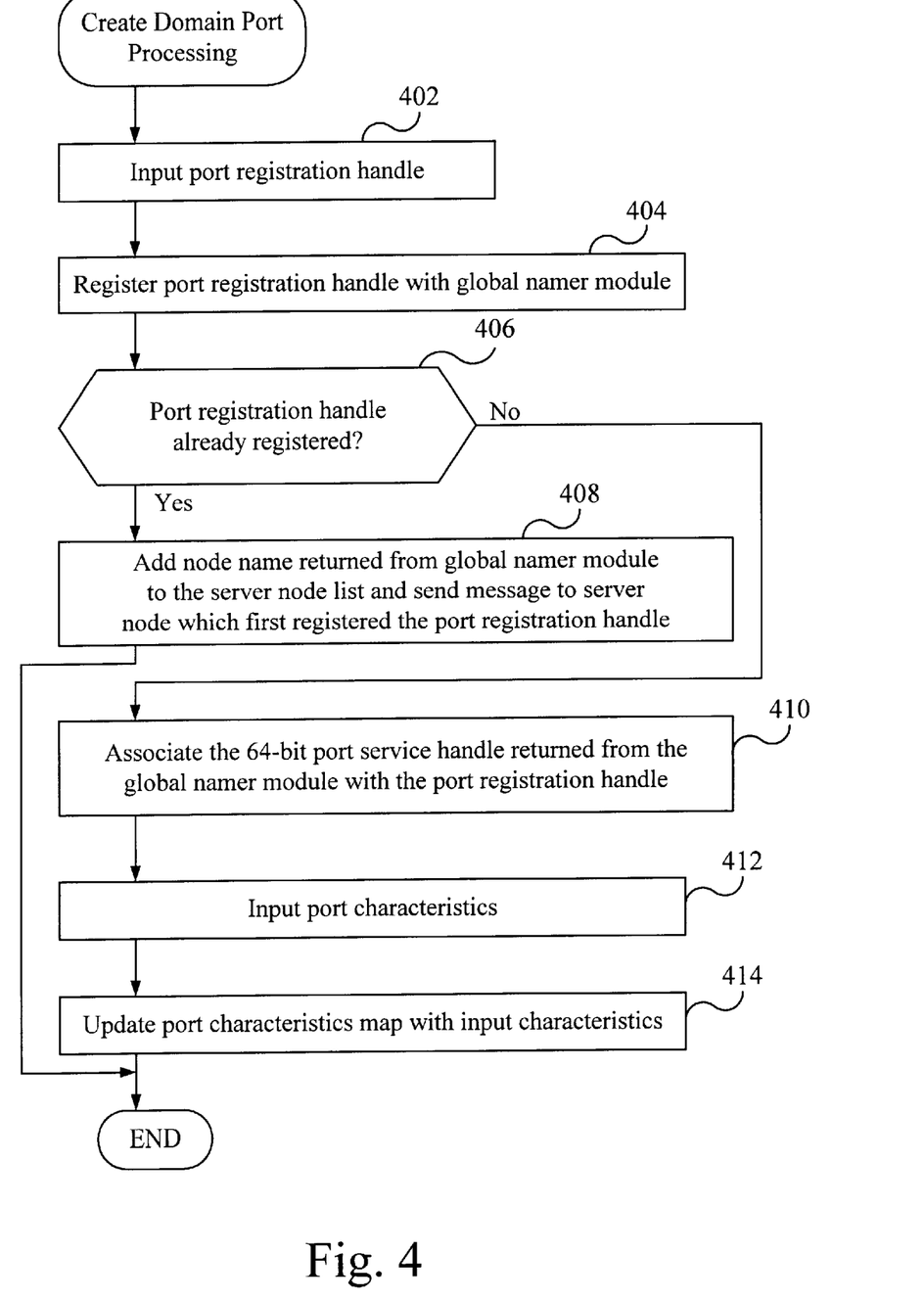
FIG. 4 is a flowchart of the processing performed for creating a domain port.

FIG. 4 is a flowchart of the processing performed for creating a domain port 212. Before a domain port 212 may be accessed by a client program 102, it must be created. The port service module 202 receives as input a port registration handle for a domain port 212 at step 402. The port registration handle is used in one of the domain port name entries 212a–n. The port registration handle and an associated port service handle are registered with a global namer module 118 in step 404. The global namer module returns a port service handle, which, in the preferred embodiment is a 64-bit value that uniquely identifies a server program 112, 114a–b, 116 or others. If the port registration handle is already registered with the global namer module 118, the global namer module returns the 64-bit port service handle along with an identifier of a server node 106, 108 or of another server node.

If the port registration handle is already registered, as in the case of replicated services, decision step 406 directs control to step 408. Otherwise, control is directed to step 410. The identifier of the server node which was returned from the global namer module 118 is added to the server node list, e.g., 216a, of the domain port 212 at step 408. In addition, a message is sent to the server node (e.g., 106, 108) which first registered the port registration handle with global namer module 118 indicating the node name. The processing is then complete.

If decision step 406 finds that the port registration handle 406 is not yet registered, control is directed to step 410 where the port service handle returned from the global namer module 118 is associated with the port registration handle. The association is used to reference a domain port 212 when a client program 102 references a service with a port service handle. The domain port characteristics are input at step 412 to define operation of the domain port. At step 414, the characteristics table 214 is updated with the input characteristics. The processing for creating a domain port 212 is then complete.

Figure 5:
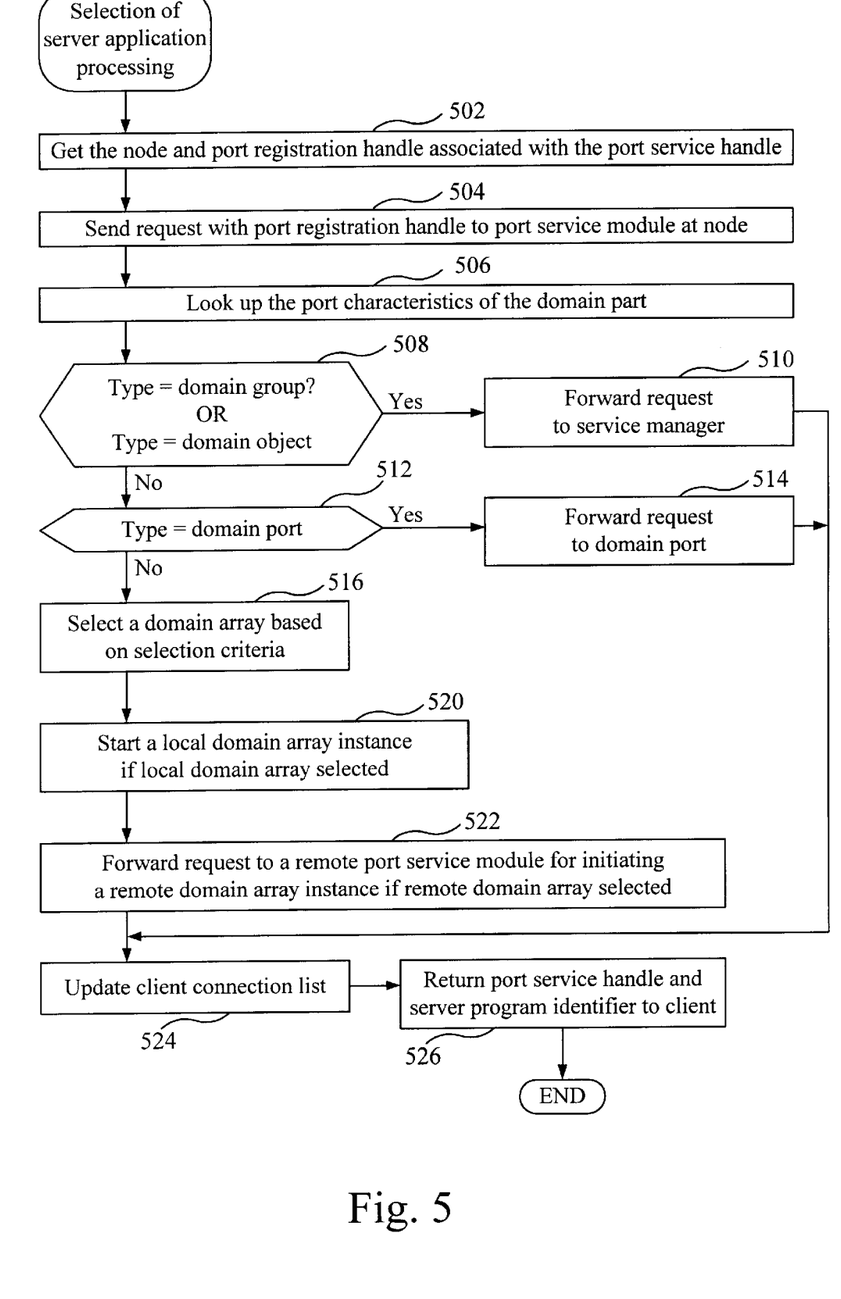
FIG. 5 is a flowchart of the processing performed in selecting a server program to process a request from a client program.

FIG. 5 is a flowchart of the processing performed in selecting a server program, e.g., 112, to process a request from a client program 102. Processing begins at step 502 where the client program 102 obtains the server node, e.g., 106, identifier and port registration handle which are associated with a desired service. Recall from FIG. 1, that the client program 102 obtains the port registration handle from the global namer module 118.

At step 504, a request is sent to the port service module 122 at the server node 106 identified in step 502. The request includes the port registration handle which was also identified in step 502. The port service module 122 obtains the port characteristics 302 of the named domain port at step 506. The characteristics 214 are used in selecting a server program 112, 114*a–b*, or 116 to process the request.

Decision step 508 tests whether the port type 308 of the domain port, e.g., 212*a*, is either domain group or domain object. If so, control is directed to step 510 where the request is forwarded to a service manager for the named service.

If the port type 308 is domain port, decision step 512 directs control to step 514 where the request is forwarded to another domain port, e.g., 212*b*, for processing.

The last exemplary possibility for a port type 308 is domain array. For a domain array port type, control is directed to step 516 where a domain array is selected to process the request. The selection is made based on the selection criteria 306 of the of the domain port characteristics 302. The selected domain array may be local or remote relative to the port service module 202. For replicated or mirrored services, both a local and a remote domain array may be selected. At step 520, an instance of a local domain array is initiated to process the request if a local domain array is selected. The request is forwarded at step 522 to a remote service module, e.g., 124, so that an instance in the remote domain array can process the request if a remote domain array is selected.

At step 524, the client connection list, e.g., 218*a*, for the domain port is updated. The identifier of the client system 104 is added to the list. The port service handle and server program identifier are returned to the client program 102 at step 526. The client program 102 may thereafter use the port service handle and server program identifier when sending messages to the server program, e.g., 112, via the port service module 122.

Figure 6:
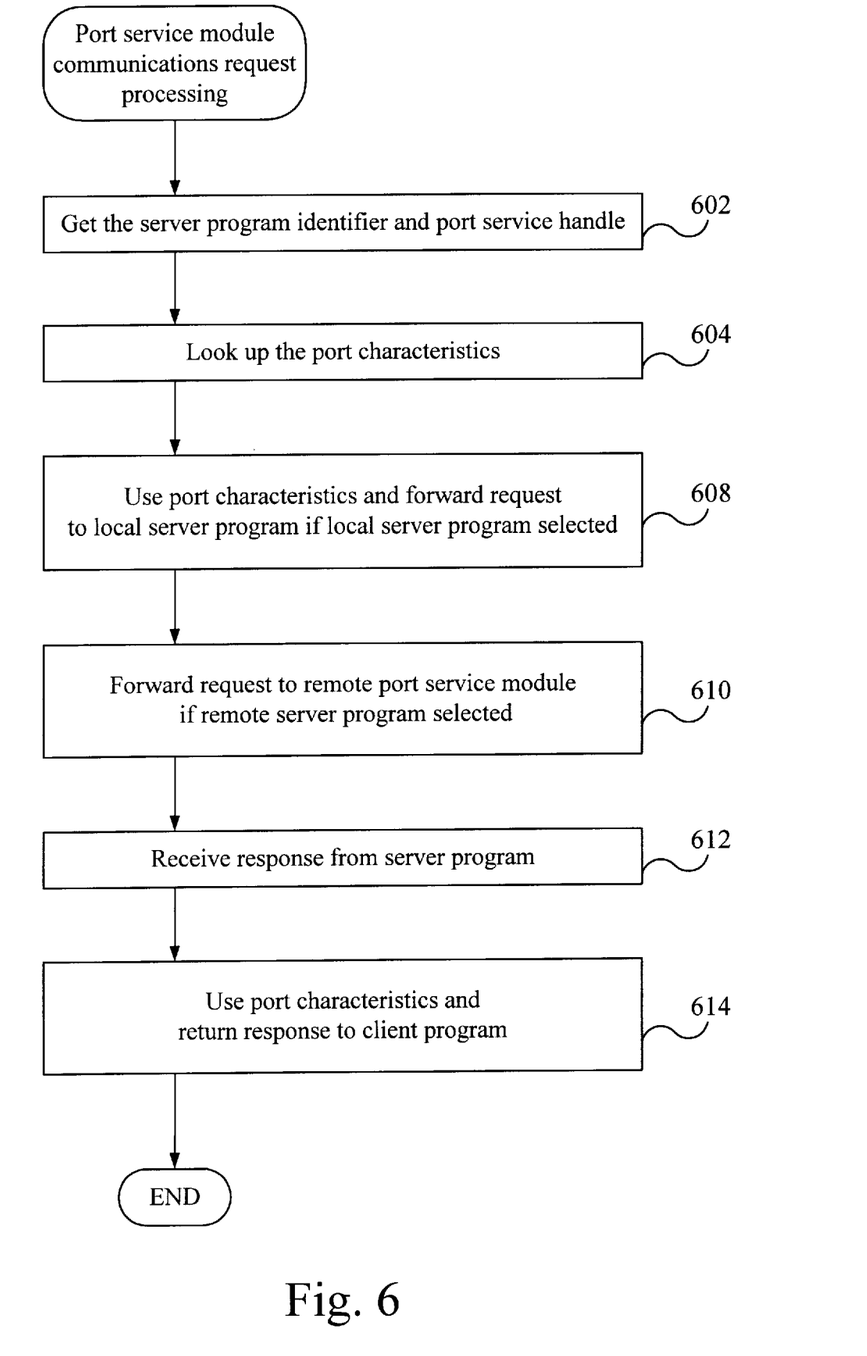
FIG. 6 is a flowchart of the processing performed by a port service module for a communications request from a client program and addressed to a server program.

FIG. 6 is a flowchart of the processing performed by a port service module, e.g., 122, of a communications request from a client program 102 addressed to a server program, e.g., 114*a*. At step 602, the port service module 202 obtains the server program identifier and port service handle from the request.

At step 604, the port service module 122 or 124 looks up the port characteristics 302 of the domain port, e.g., 212*a*, associated with the port service handle. Note that a server program 112 is "local" relative to a port service module 122 if both are hosted on the same server node 106. Also, the third server program 116 is "remote" relative to port service module 122 because the third server program 116 is hosted on a different server node 108. If the server program, e.g., 112, identified by the server program identifier is local relative to the port service module 122, at step 608 the request is forwarded, with control determined by the port characteristics 302, to the local server program for processing. At step 610, if a remote server program is selected the request is sent to a port service module, e.g., 124, of the server node 108 that hosts the remote server program, e.g., 116.

Processing continues at step 612 where the port service module 122 receives a response from the server program, e.g., 112. At step 614, the port characteristics 302 are used in returning the response to the client program 102.

The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A computer implemented method for providing a client program with access to a service provided by a server program, comprising the steps of:

said client program requesting a global namer module for said service;

said client program receiving from said global namer module an identifier of a port service module having a port used to access said server program;

said client program requesting said port service module for said service; and said port service module providing said port, and via said port, initiating an instance of said server program;

wherein said global namer module associates said service with said port, and said port service module associates said port with said server program, thereby eliminating the need for said client program and said server program to coordinate directly with one another as to naming of services.

2. The method of claim 1 wherein said port is selected from a plurality of ports, each supporting a different type of communication protocol.

3. The method of claim 1 wherein said port provides functions to said server program.

4. The method of claim 1 comprising the further step of said port service module using characteristics of said port to control communications between said client program and said server program, whereby the workload of said client program and said server program is reduced.

5. The method of claim 1 wherein said steps of said client program requesting a global namer module, and said client program requesting said port service module, use a name of said service.

6. The method of claim 1 further comprising the step of said port service module initiating at least one additional instance of said server program.

7. The method of claim 1 wherein said port is of a type selected from a group consisting of a domain array, a domain port, a domain group, and a domain object.

8. The method of claim 4 wherein said characteristics include monitoring different types of error conditions, and ordering, counting, compressing, encrypting, logging, mirroring, and striping a message exchanged between said client program and said server program.

9. The method of claim 4 wherein each of said characteristics is associated with a function.

10. The method of claim 6 wherein said step of said port service module initiating at least one additional instance is invisible to said client program.

11. The method of claim 6 wherein said step of said port service module initiating at least one additional instance uses one additional port service module for one of said at least one additional instance of said server program.

12. A client-server data processing system comprising:
- a server node running a server program providing a service;
- a client node running a client program accessing said service;
- at least one port service module having a plurality of ports, associating said ports with a plurality of said server programs, and receiving a request for service from said client program; and
- a global namer module for associating a plurality of said services with said ports and for providing the identity of an identified port service module having an identified port used to access said server program;
- wherein, in response to said request, said identified port service module provides said identified port, and, via said port, initiates instances of said server program, and said system eliminates the need for said client program and said server program to coordinate directly with one another as to naming of services.

13. The system of claim 12 wherein each of said ports supports one communication protocol.

14. The system of claim 12 wherein said ports provide functions to said server program.

15. The system of claim 12 wherein said identified port service module uses characteristics of said identified port to control communications between said client program and said server program, whereby the workload of said client program and said server program is reduced.

16. The system of claim 12 wherein said client program uses a name of said service to request said service.

17. The system of claim 12 wherein said identified port service module initiates at least one additional instance of said server program.

18. The system of claim 15 wherein said characteristics include monitoring different types of error conditions, and ordering, counting, compressing, encrypting, logging, mirroring, and striping a message exchanged between said client program and said server program.

19. The system of claim 15 wherein each of said characteristics is associated with a function.

20. The system of claim 17 wherein said identified port service module initiating at least one additional instance is invisible to said client program.

21. The system of claim 17 wherein said identified port service module initiating at least one additional instance uses one additional port service module for one of said at least one additional instance of said server program.

22. The system of claim 12 wherein said identified port is selected from a group consisting of a domain array, a domain port, a domain group, and a domain object.

23. A computer-readable medium embodying program instructions for causing a computer to provide a client program with access to a service provided by a server program, by the steps of:
- said client program requesting a global namer module for said service;
- said client program receiving from said global namer module an identifier of a port service module having a port used to access said server program;
- said client program requesting said port service module for said service; and
- said port service module providing said port, and via said port, initiating an instance of said server program;
- wherein said global namer module associates said service with said port, and said port service module associates said port with said server program, thereby eliminating the need for said client program and said server program to coordinate directly with one another as to naming of services.

* * * * *